Nov. 19, 1940.  J. UHING  2,222,006
ELECTRICAL COMPENSATOR
Filed April 28, 1937
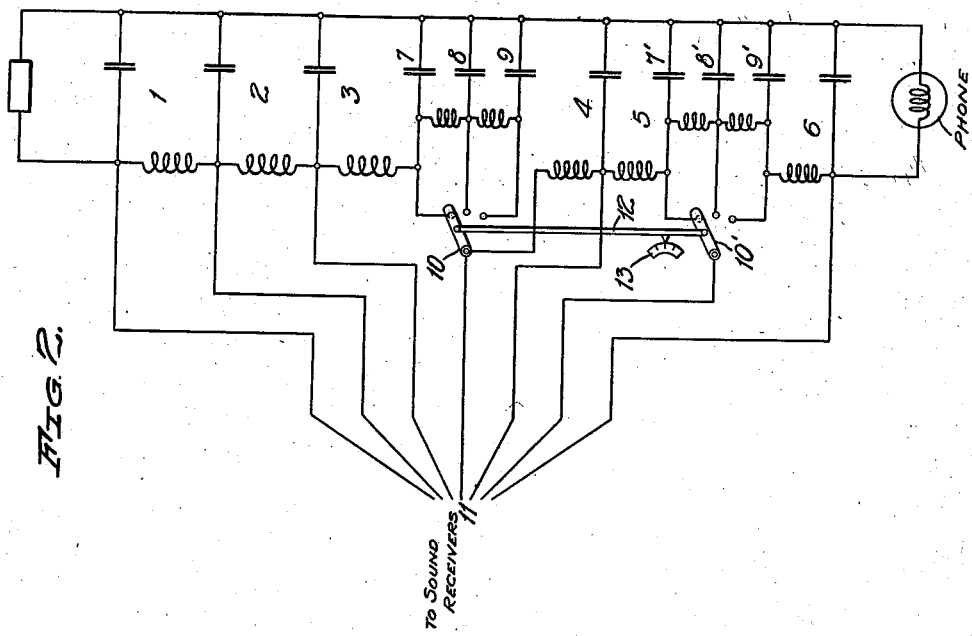
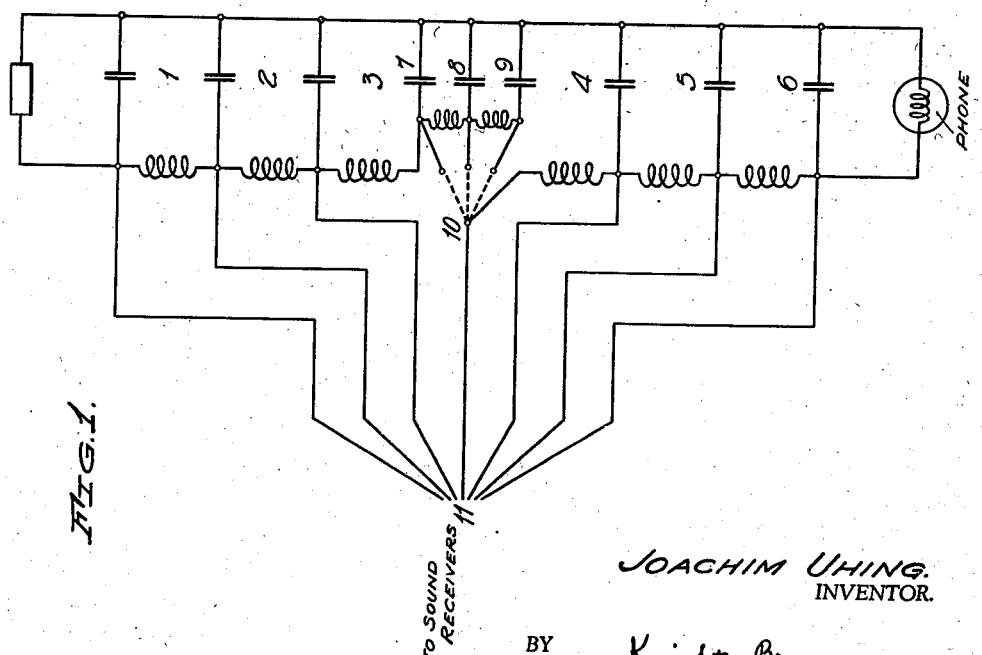
JOACHIM UHING.
INVENTOR.
BY Knight Bros
ATTORNEYS.

Patented Nov. 19, 1940

2,222,006

UNITED STATES PATENT OFFICE 2,222,006

ELECTRICAL COMPENSATOR

Joachim Uhing, Kiel, Germany, assignor to Electroacustic Gesellschaft mit beschränkter Haftung, Kiel, Germany, a firm Application April 28, 1937, Serial No. 139,509
In Germany May 2, 1936

4 Claims. (Cl. 177—386)

The present invention relates to electrical compensators to be used in systems for the directional reception of sound, as described, for instance, in U. S. Patent No. 1,893,741 to Hecht et al.

It is known, that in devices that serve the purposes of taking bearings of and listening to sounds so-called compensators are employed to determine the direction of such sounds. These compensators consist, according to the type of bearing and listening device and the type of receivers employed, of one or more electrical lag chains. These chains serve to compensate the differences of time at which the sound arrives at the receivers distributed over the receiving area. The adjusted time differences of a sound arriving from a certain direction are not only dependent on the geometrical arrangement of the receivers employed and on the directional characteristic. They also depend on the magnitude of the speed with which the sound travels through the medium in which the bearings are taken. If one changes the medium or if the properties of the medium itself which affect the speed of the sound change, as water changes its salinity or temperature, or as air changes its temperature or moisture, the figures arrived at by the bearings taken will show discrepancies and the maximum or minimum obtained will be blurred.

In order to be able to adapt the compensators to the changing conditions of the medium the idea was introduced of constructing chains of variable selfinduction, f. i. by changing the magnetic circuit. This method, especially in the case of multiple chain compensators, requires a great amount of balancing and adjusting means. It is unsatisfactory also because incidentally it leads to an undesirable increase of the limit of error. Another well-known method of correcting the sound velocity is by making the sliding contacts on the contact path which is connected to the lag chains adjustable, singly or collectively, so as to be able to alter the results obtained by certain corrective values. These measures occasion considerable expenditure in the matter of construction, material, and adjustment. This idea becomes particularly difficult to carry out in practice, entailing very expensive and sensitive constructions, in cases where the contact paths are to be fitted on spherical or conical surfaces.

By the present invention the problem of making the lag values of the chain variable, and thereby adaptable to such variation ranges of sound velocity as occur, is solved by adding to the individual members of the lag chain corrective members, a measure relatively easy of execution. It gives rise to all the less expense since, as tests have proved, it suffices to insert said corrective members only at every third or fourth member of the chain.

In the accompanying drawing, Figures 1 and 2 show diagrammatically two examples of a lag chain with corrective members added. In both figures the numerals 1—6 indicate the normal members of the chain. In Figure 1 after the third normal member 3 of the chain a corrective section containing the members 7, 8, and 9 is inserted. The individual steps of the corrective members can be cut out selectively by means of a switch 10. The lines 11 lead to the contact paths. In the presence of several corrective sections, connected between different normal members of the chain, such as for instance the additional corrective members 7', 8', 9' inserted after the normal member 5 in Figure 2, the equipment can easily be so arranged as to enable all corrective sections to be varied simultaneously in steps, by mechanically coupling the arms of their appertaining switches such as 10 and 10', as shown at 12 in Figure 2.

In this case it is possible to mark once and for all the several positions of the switches with the corrections for which they stand, f. i. with the degrees of temperature as shown at 13.

In the following a numerical example of the value of the corrective chain sections is given for an assumed time lag chain. It is assumed that the compensator be used for a group of submarine sound receivers which are arranged in a circle of the diameter D=3 meter. In this case the greatest time lag of the sound is $$T = \frac{D}{c}$$

whereby $c$ represents the speed of sound in water. At a water temperature of 20° C. and a salinity of the water of 20°/oo, $c$=1500 m/sec. Thus the greatest time lag would amount to $$T = \frac{3}{1500} = 2 \times 10^{-3}$$

sec. Assuming that the electric compensator consists of $n$=100 individual sections, the time lag brought about by each individual section amounts to $$\tau = \frac{T}{n} = 2 \times 10^{-5}$$

sec. In the present example, it is proposed to insert, according to the invention, after every fifth chain section a corrective section, and that each corrective section consist, for instance, of five steps. These corrective elements, amounting altogether to $n'=5\times20=100$ elements, should have the effect, when they are all in circuit, that the compensator operates correctly, not for a temperature of 20° C. but for a temperature of 5° C. At 5° C. and the same salinity of 20°/oo, the speed of sound in water is $c'=1450$ m/sec. The time lag $\tau'$ of each corrective element is figured according to the formula $$\frac{D}{c'}=\frac{3}{1450}=n\tau+n'\tau'$$

This means that $$\tau'=\frac{3}{145000}-\tau=2.07\times10^{-5}-2\times10^{-5}=7\times10^{-7}$$

Thus, if each of the $5\times20$ corrective elements contained in the corrective sections is calculated so that its time lag amounts to $7\times10^{-7}$ sec., the compensator will produce a correct indication at 5° C. water temperature when all corrective elements are thrown into circuit. These elements may be inserted in five steps in the manner shown in Figure 2 of the drawing, whereby a new step of twenty corrective elements can be thrown into circuit for each drop of the water temperature by 3° C.

This method of correction presents the further advantage that the corrective members can be exchanged and that they can also subsequently be fitted into an existing compensator without otherwise substantially altering the structure of the device.

What I claim is:

1. In an electric compensator for the directional reception of sound, a time lag chain composed of a plurality of main impedance members adapted to a given sound velocity and having individual connecting means for connecting them with sound receivers respectively, correcting chain members comprising longitudinal and transversal impedances, and means for connecting said corrective members with said main members for varying the time lag of the chain in accordance with the variations of the sound velocity in the carrier medium.

2. In an electric compensator for the directional reception of sound, a time lag chain composed of a plurality of main impedance members adapted to a given sound velocity and having individual connecting means for connecting them with sound receivers respectively, a variable corrective section comprising a plurality of intercoupled corrective members each having longitudinal and transversal impedances, and means for selectively inserting an adjustable portion of said corrective section into said chain for varying the time lag of the chain in accordance with variations of the sound velocity in the carrier medium.

3. In an electric compensator for the directional reception of sound, a time lag chain composed of a plurality of main impedance members adapted to a given sound velocity and having individual connecting means for connecting them with sound receivers respectively, said members having longitudinal and transversal reactances, a plurality of corrective chain members spaced between said main members at intervals of at least two main members, and means for connecting said corrective members with said main members for varying the time lag of the chain in accordance with variations of the sound velocity in the carrier medium, each of said corrective members having longitudinal and transversal reactances designed and arranged relatively to one another similarly to said longitudinal and transversal reactances of said main members.

4. In an electric compensator for the directional reception of sound, a time lag chain composed of a plurality of main impedance members adapted to a given sound velocity and having individual connecting means for connecting them with sound receivers respectively, said members having longitudinal and transversal reactances, a plurality of corrective sections spaced between said main members at intervals of at least two main members, each of said sections containing a plurality of correcting chain members each having longitudinal and transversal reactances, and variable means for inserting a desirable portion of each of said corrective sections simultaneously into said chain for varying the time lag of the chain in accordance with variations of the sound velocity in the carrier medium.

JOACHIM UHING.